US011366492B2

(12) United States Patent
Ghirardi et al.

(10) Patent No.: US 11,366,492 B2
(45) Date of Patent: Jun. 21, 2022

(54) PROGRAMMABLE DEVICE PROVIDED IN A PRODUCTION ENVIRONMENT FOR ASSISTING AN OPERATOR

(71) Applicant: Comau S.p.A., Grugliasco (IT)

(72) Inventors: Ugo Ghirardi, Turin (IT); Luca Maria Lachello, Grugliasco (IT)

(73) Assignee: Comau S.p.A., Grugliasco (IT)

( * ) Notice: Subject to any disclaimer, the term of this patent is extended or adjusted under 35 U.S.C. 154(b) by 274 days.

(21) Appl. No.: 16/631,766

(22) PCT Filed: Jul. 24, 2018

(86) PCT No.: PCT/IB2018/055497
§ 371 (c)(1),
(2) Date: Jan. 16, 2020

(87) PCT Pub. No.: WO2019/021176
PCT Pub. Date: Jan. 31, 2019

(65) Prior Publication Data
US 2020/0183445 A1  Jun. 11, 2020

(30) Foreign Application Priority Data
Jul. 26, 2017 (IT) ........................ 102017000085336

(51) Int. Cl.
*G01V 8/12* (2006.01)
*G06F 1/16* (2006.01)
(Continued)

(52) U.S. Cl.
CPC ................ *G06F 1/163* (2013.01); *G01V 8/12* (2013.01); *G05B 19/41805* (2013.01);
(Continued)

(58) Field of Classification Search
CPC ................ G01V 8/12; G05B 19/41805; G05B 2219/31046; G05B 2219/31048; G05B 2219/31264
See application file for complete search history.

(56) References Cited

U.S. PATENT DOCUMENTS 9,372,278 B2     6/2016   Lopetrone
10,310,472 B2 *  6/2019   Matergia ............... G05B 19/056
(Continued)

FOREIGN PATENT DOCUMENTS

EP           3053710 B1      6/2017

OTHER PUBLICATIONS

Brian Close, "Augmented Reality Training Tools for Manufacturers", May 26, 2017 (May 26, 2017), Light Guide Systems Retrieved from the Internet:URL:http://lightguidesys.com/blog/augmented-reality-training-tools-manufacturers/XP002779284 [retrieved on Mar. 19, 2018].

(Continued)

*Primary Examiner* — Kevin K Pyo
(74) *Attorney, Agent, or Firm* — Young Basile Hanlon & MacFarlane, P.C.

(57) ABSTRACT

A programmable device (D) arranged in a production environment, to assist an operator (O) in performing manual assembly operations carried out by the operator (O), particularly during assembly operations performed on pieces (P) transported by pallets (5) in a production line (1). The device (D) comprises an assembly means usable by the operator (O), a lighting device (4) for lighting a work area in which the operator (O) works, a sensor (6) configured to detect the position of the assembly means, an input device (10) usable by the operator, and an electronic control system (8) configured to memorize a learning sequence including a sequence of manual assembly operations.

14 Claims, 3 Drawing Sheets

(51) Int. Cl.
G05B 19/418 (2006.01)
G06Q 50/04 (2012.01)
(52) U.S. Cl.
CPC ... *G06Q 50/04* (2013.01); *G05B 2219/31027* (2013.01); *G05B 2219/31046* (2013.01); *G05B 2219/31048* (2013.01); *G05B 2219/31264* (2013.01); *G05B 2219/31472* (2013.01)

(56) References Cited

U.S. PATENT DOCUMENTS

| | | |
|---|---|---|
| 2005/0006569 A1 | 1/2005 | Yoshiyuki |
| 2011/0178627 A1 | 7/2011 | Wechter et al. |
| 2012/0062725 A1 | 3/2012 | Wampler, II et al. |
| 2013/0123945 A1 | 5/2013 | Saylor et al. |
| 2013/0325155 A1 | 12/2013 | Ryznar et al. |
| 2015/0346383 A1 | 12/2015 | Lopetrone |
| 2016/0171772 A1 | 6/2016 | Ryznar et al. |
| 2016/0221717 A1 | 8/2016 | Ghirardi et al. |

OTHER PUBLICATIONS

Paul Ryznar, "Vision systems and augmented reality error-proof assembly", Oct. 20, 2016 (Oct. 20, 2016), Vision Systems Design Retrieved from the Internet:URL:https://www.vision-systems.com/articles/print/volume-21/issue-9/features/vision-systems-and-augmented-reality-error-proof-assembly.htmlXP002779283[retrieved on Mar. 19, 2018].

* cited by examiner

PROGRAMMABLE DEVICE PROVIDED IN A PRODUCTION ENVIRONMENT FOR ASSISTING AN OPERATOR

CROSS-REFERENCE TO RELATED APPLICATIONS

This application is a national stage application, filed under 35 U.S.C. § 371, of International Patent Application No. PCT/IB2018/055497, filed Jul. 24, 2018, and Italian Patent Application No. 102017000085336, filed Jul. 26, 2017, which are incorporated by reference in their entirely.

TECHNICAL FIELD

The present invention relates to programmable devices provided in a production environment for assisting an operator. In particular, the invention relates to a programmable device designed to assist an operator in performing manual assembly operations, for example, assembly operations carried out on pieces transported by pallets in a production line.

BACKGROUND

In modern production lines, particularly in the automotive sector, parts or basic components advance along a pallet transport line through a series of assembly stations, where further parts and components are assembled in succession on each basic component carried by a pallet provided for the transport of parts or components. Currently, a solution in use that is alternative to the one indicated above to transport parts or components is that of configuring a plurality of Automated Guided Vehicles (AGVs), with the pieces to be assembled on board, which move within the production environment. The assembly operations are performed manually by operators with the help of automated assembly systems. In production environments of this type, production must be maximized, ensuring that the operators perform assembly operations quickly and correctly. Fulfilling this requirement in an optimal way is not easy since the sequence of assembly operations, which the operators must perform, varies according to the pieces or components transported by the pallets, which, in turn, vary according to the production request.

Examples of systems provided in a production environment to assist an operator in performing manual assembly operations are described in the documents US 2012/0062725 A1, U.S. Pat. No. 9,372,278 B2 and US 2013/325155 A1.

SUMMARY

The object of the present invention is to provide a programmable device of the type indicated above, which is particularly effective in ensuring that the assembly operations are carried out correctly by the operators, and that it is simple and intuitive to use.

A further object of the invention is to achieve the aforesaid objectives with a device that allows rapid adaptation with respect to the sequence of operations that the operator must perform, in the event that the need to change the sequence of operations arises.

In view of achieving these objects, the invention relates to a programmable device arranged in a production environment, to assist an operator in the execution of manual assembly operations performed by said operator in said production environment, particularly in the course of assembly operations performed on pieces transported by pallets in a production line, said device comprising:
  an assembly means usable by said operator for performing said manual assembly operations on said pieces transported by said pallets, said assembly means being in particular a tool or the operator's hands directly;
  at least one input device usable by said operator;
  at least one lighting device having at least one light source for illuminating a work area in which said operator works, said lighting device being configured to indicate the correct sequence of manual operations to be carried out on said pieces, carried by said pallets, to said operator;
  at least one sensor configured to detect the spatial coordinates of said assembly means with reference to said work area; and
  an electronic control system operatively connected to said input device, to said at least one lighting device and to said at least one sensor, said electronic control system being configured to memorize a learning sequence including a sequence of said manual assembly operations, in order to register the position of said assembly means during the execution—in real time—by said operator (O) of a work cycle including said sequence of operations, wherein said learning sequence comprises the following steps:
  said electronic control system provides a command to said sensor to continuously observe said work area, said operator and said assembly means in order to detect the spatial coordinates of said assembly means;
  said electronic control system receives said spatial coordinates of said assembly means detected by said sensor and communicates said coordinates to said lighting device;
  said lighting device projects a graphic instruction onto said work area, in particular a symbol, by means of said light source, at the spatial coordinates of said assembly means;
  said electronic control system receives a request to register the position of said assembly means following the actuation of said input device;
  said operator passes to a subsequent operation of said learning sequence or activates said input device to terminate said learning sequence.

Thanks to the characteristics indicated above, the programmable device according to the present invention is particularly flexible with respect to production requirements, as it is possible to start a new learning sequence in a simple and intuitive way, whenever the sequence of operations that the operator must perform varies. Moreover, this device is suitable for achieving the predetermined objects both in the case in which the assembly operations are carried out by the operator's hands, and in the case in which the operator uses an assembly tool for assembling the components.

The electronic control system of the device according to the invention is also configured to collaborate with the operator to perform the work cycle according to the learning sequence carried out, wherein:
  said electronic control system regulates the light beam of said lighting device at the registered position of said assembly means;
  said lighting device illuminates said work area, in particular by projecting said symbols by means of said light source;
  said operator positions said assembly means at the position indicated by said lighting device and actuates an input for the start of the work cycle;

said electronic control system requires said sensor to locate said assembly means;

said sensor calculates the spatial coordinates of said assembly means;

said electronic control system receives the spatial coordinates of said assembly means from said sensor and verifies the correspondence between the position of said assembly means and said symbols;

said operator verifies the correspondence result that has occurred and performs an assembly operation indicated by said symbol.

In the case in which the assembly means are in the form of a tool, the input device is arranged on the tool in the form of a recording button manually operable by the operator to request a recording of the position of the tool, to terminate the learning sequence or to start the work cycle.

In the case in which manual operations are performed directly by the operator's hands and the assembly tool is, therefore, not present, the aforesaid input device can be produced in the form of a device arranged on the wrist of the operator (for example, a SmartWatch) or a device arranged on the operator's arm (for example, a SmartPhone or Tablet). An additional alternative solution that can be implemented to produce the input device is that of providing a voice recognition device (for example, a microphone on the throat that is immune to environmental noise).

In a preferred embodiment, said sensor is a system of inertial sensors arranged to determine the position of the assembly means, in such a way that said system is able to detect the position in space of said assembly means.

Additional variations to the embodiments indicated above are described in the description which follows and in the attached claims.

The present description is also directed at a method for assisting an operator during manual assembly operations conducted in a production environment, particularly during assembly operations performed on pieces transported by pallets in a production line, wherein said operator cooperates with a programmable device having the characteristics described in detail in the following part of the present description.

BRIEF DESCRIPTION OF THE DRAWINGS

Further characteristics and advantages of the present invention will become apparent from the description that follows with reference to the attached drawings, provided purely by way of non-limiting example, wherein.

DETAILED DESCRIPTION

In the following description, various specific details are illustrated aimed at a thorough understanding of the embodiments. The embodiments can be implemented without one or more of the specific details, or with other methods, components, materials, etc. In other cases, known structures, materials or operations are not shown or described in detail to avoid obscuring various aspects of the embodiments. The references used here are only for convenience and do not, therefore, define the field of protection or the scope of the embodiments.

Figure 1:
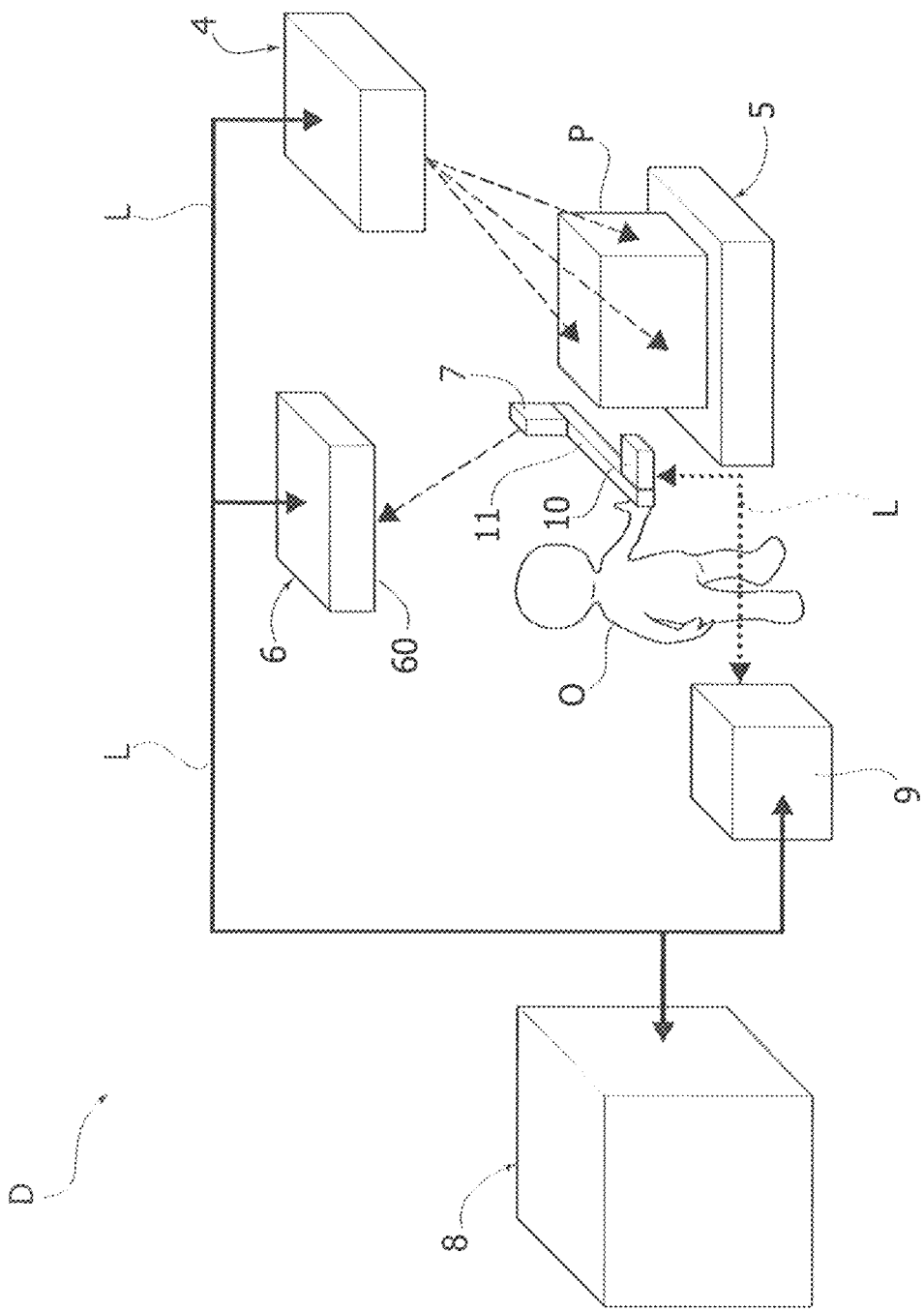
FIG. 1 is a schematic view of a preferred embodiment of the device according to the present invention.

In the schematic view of FIG. 1, the reference D indicates—in its entirety—a preferred embodiment of a programmable device according to the present invention, to assist an operator O in performing manual assembly operations in a production environment. In the embodiment illustrated in the drawings, the invention is directed at a device D for assisting an operator O, capable of performing assembly operations on pieces P transported by pallets 5 which move along a production line 1.

Figure 2:
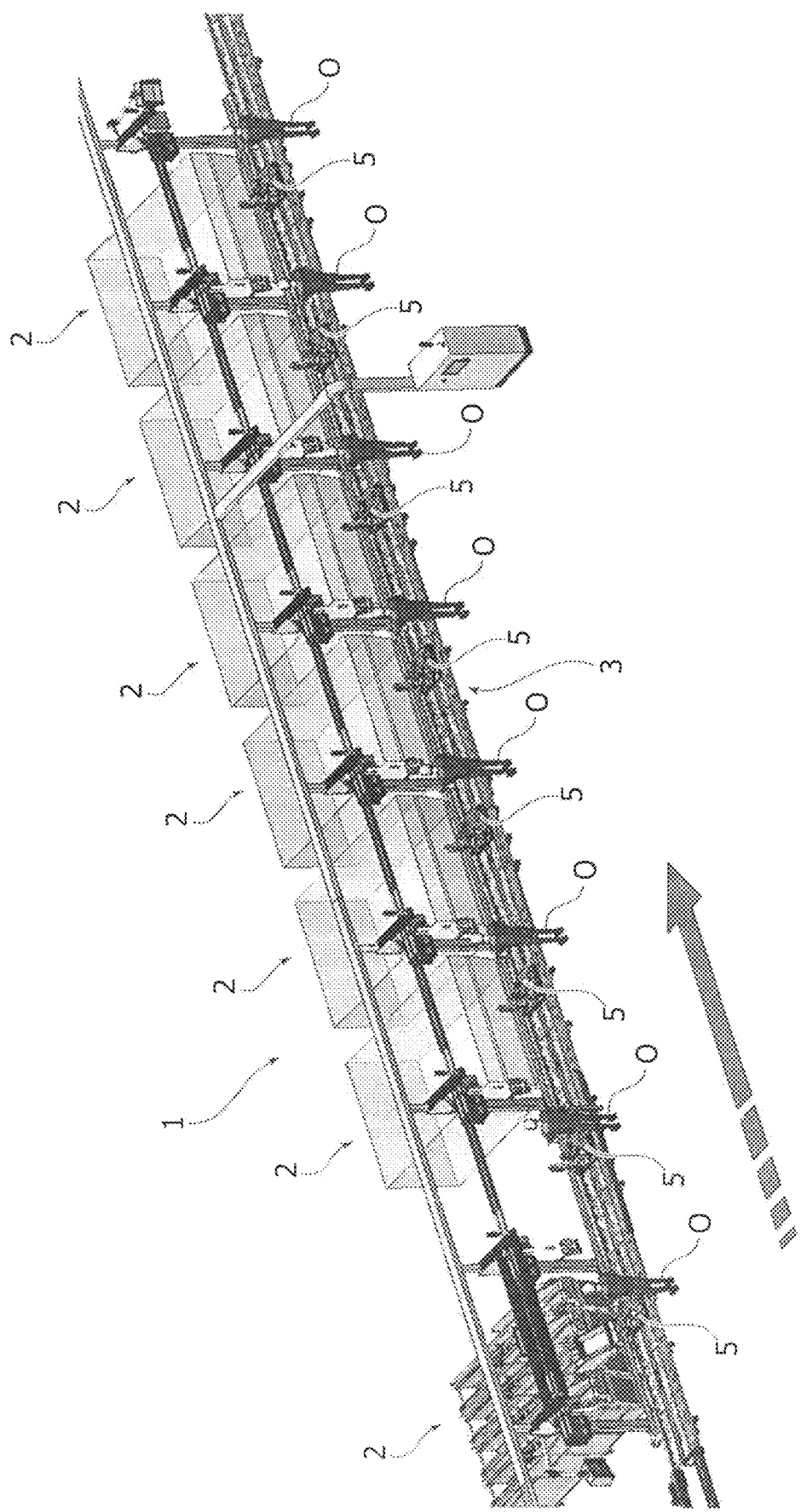
FIG. 2 is an example of a production line with which the device according to the present invention can be associated.

With reference to FIG. 2, numeral 1 indicates—in its entirety—a production line with which the device D according to the invention can be associated. The production line 1 is of the continuous motion type and comprises a plurality of assembly stations 2 arranged in series with each other, in which an operator O is assigned to each assembly station 2. The line 1 includes a chain conveyor device 3 mounted adjacent to the assembly stations 2 and arranged to allow the transport of a plurality of pallets 5 along the line 1. Each pallet 5 is arranged, for example, to carry a base piece (for example a cylinder head) on which the operator O manually assembles further components. All the details relating to a continuous motion production line as described above are part of a European patent application already proposed by the same Applicant.

Of course, the production line illustrated in FIG. 2 and described above is provided purely by way of example, since the present invention is also applicable to other types of production environments, for example, a stop & go line, a single production cell or an environment populated by a plurality of AGVs.

Returning to the example illustrated in FIG. 2, an operator O is assigned to each of the aforesaid assembly stations 2, who works on the pieces transported by the pallets 5 which move continuously in front of him. Each operator O works on all the pallets 5 that pass through the assembly station 2 that he is manning. For each pallet 5 that moves continuously through the station, the operator performs a plurality of assembly operations on the pieces P transported by the pallets 5, moving by the side of the line 1 in order to follow the pallet 5 in its movement. If all the manual operations are carried out correctly and within the expected time, when the pallet—following its continuous movement—leaves the aforesaid assembly station, the component carried by the pallet contains all the additional components correctly mounted in the station.

In a concrete embodiment of the device D according to the invention, the pallet 5 is produced according to that illustrated in the patent application EP 15153558 by the same Applicant, and the device D is associated with each assembly station 2.

According to an important characteristic of the invention, the device D is arranged to assist an operator O, capable of performing assembly operations on pieces P, both in the case in which the operator performs operations by means of an assembly tool, and in the case in which the operator uses his hands directly to perform these operations.

In the following description, the different elements of the device will now be described.

Figure 4:
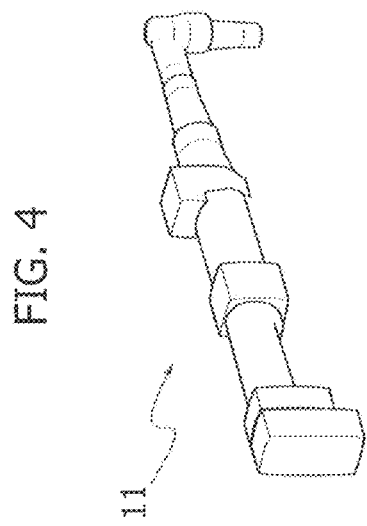
FIG. 4 illustrates an example of an assembly tool with which an operator carries out assembly operations.
Figure 3:
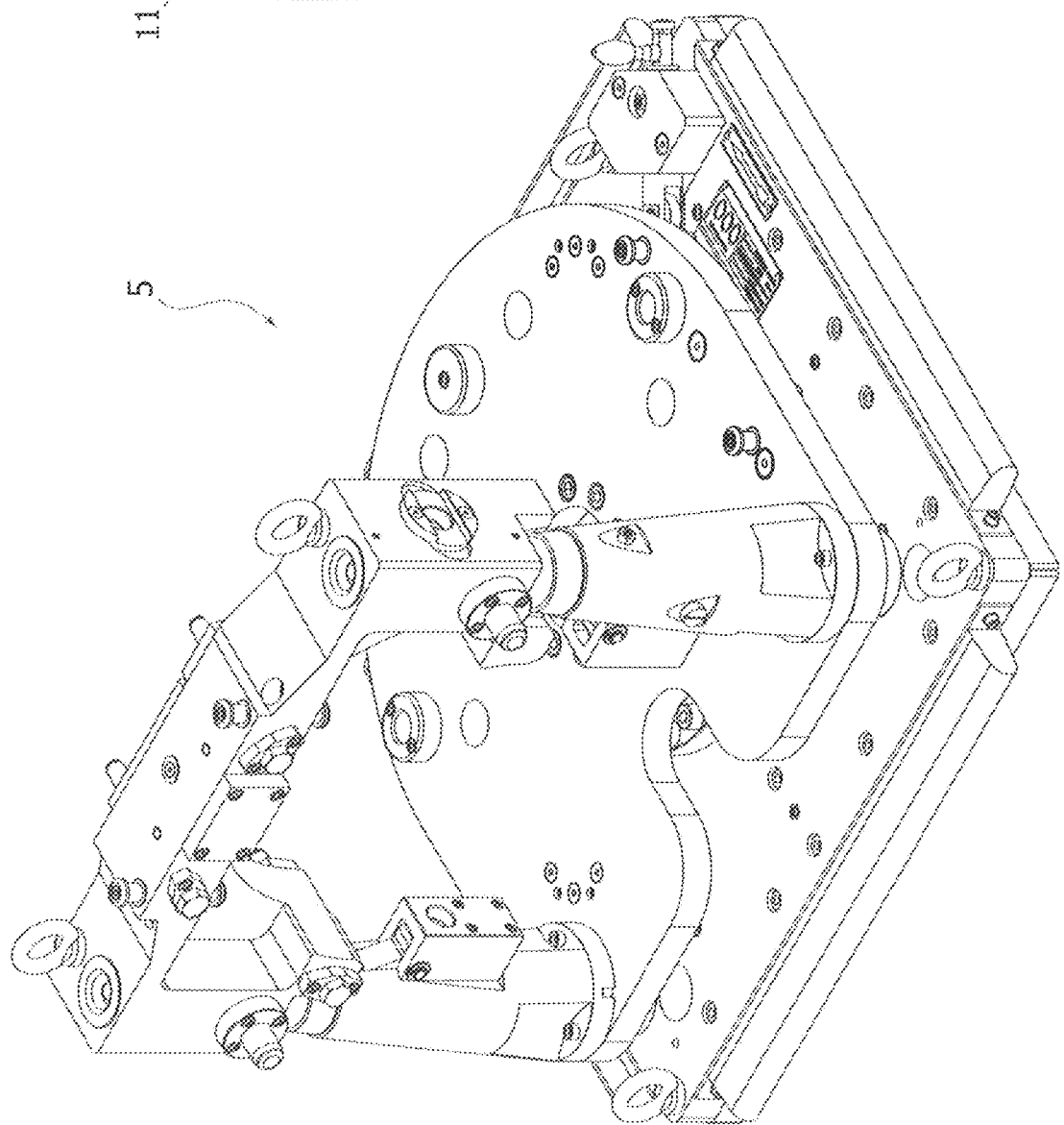
FIG. 3 illustrates an example of a pallet for transporting pieces on which assembly operations are performed.

In the embodiment illustrated in FIG. 1, the device D is illustrated schematically in the case in which the operator carries out the assembly operations by means of a tool. According to this Figure, the device D comprises an assembly tool 11 usable by the operator O for carrying out the manual assembly operations on the parts P transported by the pallets 5. A concrete embodiment example of an assembly tool is illustrated in FIG. 4, which illustrates a screwdriver tool 11. This screwdriver is illustrated purely by way of example, since, in the case in which the operator uses a tool for carrying out assembly operations, it can also be implemented in other forms (for example, a torque wrench).

Returning to FIG. 1, the device D further comprises at least one lighting device 4 having at least one light source for illuminating a work area in which the operator O works.

As will be explained in greater detail below, the lighting device 4 is configured to indicate the correct sequence of manual operations to be carried out on the pieces P, transported by the pallets 5, to the operator O.

According to a technique known per se, the lighting device 4 can be, for example, a two-dimensional laser device, designed to generate a punctiform laser beam with which an optical diffraction element is interposed to project an image, such as, for example, a motif with dots or crosses or stripes.

To overcome some technical limitations of the two-dimensional laser device, the lighting device 4 can be alternatively produced in the form of a three-dimensional laser scanner (also in this case according to a technique known per se). In the case of three-dimensional laser scanners, a punctiform laser beam is deflected by a pair of mirrors on galvanometers to create symbols and/or writing. Moreover, by using three-dimensional laser scanners, it is also possible to specify the distance between the piece P and the lighting device 4, so as to keep the size of the projected image constant at the various points of the piece P. In the light of what has been described above, the use of three-dimensional laser scanners allows more complex graphic instructions to be obtained with respect to the instructions provided by the two-dimensional laser devices, such as arrows, concentric circles and writing.

The device also comprises at least one input device which can be used by the operator (described in greater detail in the following description) and at least one sensor 6 configured primarily for detecting the spatial coordinates of the assembly tool 11 or the hands of the operator O with reference to the work area in which the operator O works.

The device D also comprises an electronic control system 8 operatively connected by means of communication lines L to the input device, to the lighting device 4, and to the sensor 6. The elements of the device D can also be connected to the electronic control system 8 by means of a wireless connection. In the embodiment illustrated in FIG. 1, in which the operator uses the tool 11 for carrying out the assembly operations on the pieces, the tool 11 is provided with a control unit 9 which communicates with the general electronic control system 8 by means of a wireless connection.

According to an essential characteristic of the device according to the present invention, the electronic control system 8 is configured to memorize a learning sequence, including a sequence of manual assembly operations, in order to register the position of the tool 11 or the hands of the operator O during a work cycle.

Memorizing this learning sequence is necessary to ensure that the device D functions in such a way as to indicate to the operator O, during a work cycle, the correct sequence of operations to be performed on the base pieces P transported by the pallets 5, cooperating with the operator O in order to guarantee the correctness of the individual operations performed.

The learning sequence performed by the device D comprises the following steps:

the electronic control system 8 provides a command to the sensor 6 to continuously observe the work area, the operator O and, if present, also the tool 11, in order to detect the spatial coordinates of the tool 11 or the hands of the operator O;

the electronic control system 8 receives the spatial coordinates of the tool 11 or the hands of the operator O detected by the sensor 6 and supplies the coordinates to the lighting device 4;

the lighting device 4 projects a graphic instruction onto the work area, for example, a symbol or some writing, by means of the light source, at the spatial coordinates of the tool 11 or the hands of the operator O detected by the sensor 6;

the electronic control system 8 receives a request to register the position of the tool 11 or, in the absence of it, the position of the hands of the operator O, following a recording input operated by the aforesaid input device;

the operator O passes to a subsequent operation of the learning sequence or activates the aforesaid input device to terminate said learning sequence.

In practice, this operating mode of the device D, in which the lighting device 4 follows the position of the hands or of the tool 11 during the execution of the operations constituting a work cycle, is at the basis of memorizing the learning sequence of the device D.

Thanks to the fact that the device D is configured to record the aforesaid learning sequence during the real-time execution of the operations constituting a work cycle, the device D has the advantage of rapidly adapting to a new sequence of operations that the operator must perform, and thus be fast and intuitive for the operator.

To ensure the correct operation of the device D, the sensor 6 and the lighting device 4 must share the same reference system, so that the x, y, z coordinates of the position of the tool 11 (or in the absence thereof, of the position of the operator's hands) can be sent from the electronic control system 8 to the lighting device 4, and the projected light is directed to the same position of the tool 11.

To be able to share the same reference system between the sensor 6 and the lighting device 4, the sensor 6 and the lighting device 4 are provided with their own calibration method configured to position the origin of a shared reference system in the middle of the pallet that carries the piece P on which the manual assembly operations must be carried out.

Based on the roto-translation matrices with respect to the origin of the sensor reference system (MOS) and the illumination source of the lighting device (MOP), it is possible for the electronic control system 8 to determine the relative position of the sensor 6 with respect to the lighting device 4, by means of the relation: MPS=MOPT*MOS.

The calibration method is carried out by the sensor 6 and by the lighting device 4 during installation of the device D, under the direction of the electronic control system 8.

In the case wherein a variation of the position of the pallet occurs (for example, for production needs), in order to re-position the origin of the shared reference system to the center of the new pallet position, it is sufficient that either the sensor 6 or the lighting device 4 re-executes the calibration method, and that the electronic control system 8 takes into account the result of the new calibration for managing the coordinates read by the sensor 6 and sent to the lighting device 4. To correctly implement this management, it is possible to use the relation MPS indicated above or the relation between the last calibration (with which the new origin of the reference system O' is obtained) and that performed during installation (with which the origin O was obtained). In the case of recalibration performed by the lighting device 4, this relationship is: MO'O=MO'P*MOPT. The roto-translation matrix MO'O is applied to the coordinates of the positions read by the sensor 6 in order to be able to communicate with the known coordinates at the lighting device 4.

In the case in which assembly operations are performed by means of the aforesaid tool 11, the input device for recording or terminating the aforesaid learning sequence is preferably manually operated by the operator O, and may consist of a button 10 arranged on the tool 11 (as illustrated in FIG. 1). Alternatively, a manually operable input can be constituted, for example, by a pedal arranged in the work area.

In the case in which manual operations are performed directly by the operator's hands and this tool is therefore not present, the aforesaid input device can be produced in the form of a device arranged on the wrist of the operator (for example a SmartWatch) or a device arranged on the operator's arm (for example a SmartPhone or Tablet).

A further alternative solution that can be implemented to produce the aforesaid input device is that of providing a voice recognition device (for example, a microphone on the throat that is immune to environmental noise).

A further alternative solution that can be implemented to produce the aforesaid input device is that of providing an input system based on the recognition by the sensor 6 of some postures of the fingers of the operator's hands such as, for example, an open hand, a closed hand or a closed hand with some fingers open. In practice, these hand postures of the operator O can be combined with macro-commands for the device D, such as, for example, the start or stop of a work cycle or even commands for advancing or retroceding a single operation forming part of the sequence of operations constituting the work cycle.

The sensor 6 can also be made according to different known solutions. For example, it can be an infrared vision system or a visible light vision system. Other possible solutions for producing the sensor 6 are an ultra-sound system or an infrared vision system with active or passive markers. In these last three cases, the sensor 6 includes (as shown in FIG. 1) an emission unit 7 arranged on the tool 11, and a receiving unit 60 arranged above the work area for receiving information from the said emission unit 7, in such a way that the sensor 6 is able to detect the position in space of the tool 11.

Alternatively to the vision or ultrasound systems, the tool 11 can be provided with a plurality of inertial sensors (accelerometers, gyroscopes and magnetometers), in such a way that the sensor 6, receiving the signal detected by these sensors, calculates the position in space of the tool 11.

As mentioned previously, the device D is configured for collaborating with the operator O to indicate the correct sequence of assembly operations to the operator. According to a further important characteristic of the invention, the electronic control system 8 is configured to perform a work cycle according to the previously indicated learning sequence, wherein:

the electronic control system 8 regulates the light beam of the lighting device 4 at the position of the tool 11 or the hands of the operator O;

the lighting device 4 illuminates the work area, in particular, by projecting symbols by means of the light source;

the operator O positions the tool 11 or his hands at the position indicated by the lighting device 4 and actuates an input for the start of the work cycle;

the electronic control system 8 requires the sensor 6 to locate the tool 11 or the hands of the operator O directly;

the sensor 6 calculates the spatial coordinates of the tool 11 or the hands;

the electronic control system 8 receives the spatial coordinates of the tool 11 or the hands of the operator from the sensor 6, and verifies the correspondence between their position and the symbols; and the operator O verifies the correspondence result that has occurred and performs an assembly operation indicated by said symbol.

To ensure the correct operation of the device D, also during the execution of a work cycle, it is necessary that the sensor 6 and the lighting device 4 share the same reference system (following the calibration method previously indicated), so that the light beam of the lighting device 4 is directed by the lighting device 4 to the x, y, z coordinates of a working position, and the sensor 6 can read the presence of the assembly means in the same position.

In practice, this operating mode of the device D, in which the sensor 6 detects the position of the assembly means following the graphic instructions projected by the lighting device 4 onto the work area, is the basis of the operation of the device D during the actual execution of a work cycle by an operator. As said previously, examples of light symbols projected by said lighting device can be very simple motifs or more complex figures depending on the type of lighting device.

The present invention is also directed at a method for assisting an operator O during assembly operations carried out in a production environment, in which the operator O cooperates with the programmable device D according to the present invention.

In the embodiment, the device D comprises a single sensor 6, a single lighting device 4 and a single tool 11, but a plurality of these elements can also be provided depending on the production environment with which the present device is associated.

Thanks to the characteristics indicated above, the device according to the invention assists an operator in performing manual assembly operations, ensuring that the assembly operations are carried out correctly by the operators, by means of a device which is simple and intuitive to use, and which allows rapid adaptation to the sequence of operations that the operator must perform each time the need to change this sequence arises.

Of course, without prejudice to the principle of the invention, the details of construction and the embodiments may vary widely with respect to those described and illustrated purely by way of example, without departing from the scope of the present invention.

The invention claimed is:

1. A method of assisting an operator (O) in performing manual assembly operations carried out by said operator (O) in a production environment, the operator (O) is assisted by a programmable device (D) arranged in said production environment, the method comprising the steps of:

providing the programmable device (D) comprising:
an assembly means usable by said operator (O) for performing said manual assembly operations on said pieces (P) transported by said pallets (5), said assembly means comprising one of a tool (11) or the operator's (O) hands directly;

at least one input device usable by said operator (O);

at least one lighting device (4) having at least one light source operable to illuminate a work area in which said operator (O) works, said lighting device (4) operable to indicate a correct sequence of manual operations to be carried out on said pieces (P), transported by said pallets, to said operator (O);

at least one sensor (6) operable to detect spatial coordinates of said assembly means (11) with reference to said work area; and an electronic control system (8) operatively connected to said at least one input device, to said at least one lighting device (4) and to said at least one sensor (6), said electronic control system (8) operable to memorize in real time a learning sequence of said manual assembly operations by said operator (O) forming a work cycle, wherein memorizing said learning sequence comprises the following steps:

providing by said electronic control system (8) a command to said sensor (6) to continuously observe said work area, said operator (O) and said assembly means and detecting the spatial coordinates of said assembly means and to continually follow a position of the assembly means during execution of the manual assembly operations constituting the work cycle;

receiving by said electronic control system (8) said spatial coordinates of said assembly means detected by said sensor (6) and communicating said received spatial coordinates to said lighting device (4);

projecting by said lighting device (4) light source a graphic instruction in said work area at the spatial coordinates of said assembly means detected by said sensor (6);

receiving by said electronic control system (8) a request to record the position of said assembly means following an actuation of said at least one input device;

passing by said operator (O) to a subsequent operation of said learning sequence or activating said at least one input device to terminate said learning sequences;

assisting by the electronic control system (8) the work cycle according to the previously recorded learning sequence, assisting the work cycle comprising:

regulating by said electronic control system (8) a light beam of said lighting device (4) at the recorded position of said assembly means;

illuminating by said lighting device (4) said work area, by projecting a graphic instruction by means of said light source;

positioning by said operator (O) said assembly means at the recorded position indicated by said lighting device (4) and actuating the at least one input device for the start of the work cycle;

requiring by said electronic control system (8) said sensor to detect said assembly means;

calculating by said sensor (6) the spatial coordinates of said detected assembly means;

receiving by said electronic control system (8) the spatial coordinates of said assembly means from said sensor;

verifying by the electronic control system (8) a correspondence between the spatial coordinates of the detected assembly means and the spatial coordinates of said recorded position; and verifying by said operator (O) a correspondence result that has occurred, wherein the operator (O) performs the manual assembly operations indicated by said graphic instruction.

2. The method of claim 1 wherein said assembly means comprises said tool (11), said at least one input device is arranged on said tool (11) in the form of a recording button (10) manually operable by said operator (O), to request a recording of the position of said tool (11), to terminate said learning sequence or to start said work cycle.

3. The method of claim 1 wherein said assembly means comprises the hands of the operator, said at least one input device is arranged on a wrist of the operator (O) and comprising a Smart-Watch-type device manually operable by said operator (O), to request a recording of the position of the hands, to terminate said learning sequence or to start said work cycle.

4. The method of claim 1 wherein said assembly means comprise the hands of the operator, said at least one input device comprises a voice recognition device operable by means of voice instructions by said operator (O), to request a recording of the position of the hands, to terminate said learning sequence or to start said work cycle.

5. The method of claim 1 wherein said assembly means comprises said tool (11), said tool (11) is one of connected directly to said electronic control system (8) or indirectly by means of a control unit (9) integrally provided with said tool (11).

6. The method of claim 2 wherein said sensor (6) comprises an infrared sensor that includes an emission unit (7) arranged on said tool (11) and a receiving unit (60) arranged above said work area, operable to receive information from said emission unit (7), in such a way that said sensor (6) is able to detect the spatial coordinates in space of said tool (11).

7. The method of claim 1 wherein said sensor (6) comprises a vision system.

8. The method of claim 1 wherein said sensor (6) comprises a system of inertial sensors arranged to determine the spatial coordinates of said assembly means.

9. The method of claim 1, wherein the graphic instruction comprises a symbol.

10. A method for assisting an operator in a production environment for use in manual assembly operations on a workpiece positioned in a work area, the method including a programmable device having a sensor, a lighting device, an input device, and an electronic control system in communication with the sensor, the lighting device and the input device, the method comprising:

recording a learning sequence comprising:
continually monitoring by the sensor the work area to detect the spatial coordinates of an assembly means positioned in the work area;

the operator positioning the assembly means in the work area at a first position having first spatial coordinates;

projecting by the lighting device a visual graphic instruction at the first spatial coordinates;

actuating the input device by the operator to record the first position;

the operator moving the assembly means in the work area from the first position to a second position having second spatial coordinates different than the first spatial coordinates;

the lighting device projected visual graphic instruction continually follows the movement of the assembly means between the first position and the second position;

actuating the input device by the operator to record the second position;

storing the spatial coordinates of the assembly means at the recorded first position, movement of the assembly means between the recorded first position and the second position, and the recorded second position in the electronic control system; and subsequently assisting a work cycle sequence by the operator in performing the manual assembly operations on the workpiece using the stored learning sequence.

11. The method of claim 10, wherein assisting the work cycle sequence further comprises:

continually monitoring by the sensor the work area to detect a presence and the spatial coordinates of the assembly means in the work area;

projecting by the lighting device the graphic instruction at the first spatial coordinates at the recorded first position;

positioning by the operator the assembly means at the projected graphic instruction at the first spatial coordinates at the recorded first position;

detecting by the sensor the spatial coordinates of the assembly means positioned in the work area;

verifying by the electronic control system through comparison of the first spatial coordinates at the recorded first position and the detected spatial coordinates of the assembly means positioned in the assembly area that the assembly means is positioned at the recorded first position; and actuating by the operator the input device verifying the assembly means is positioned at the recorded first position.

12. The method of claim 11, wherein subsequent to the actuating by the operator the input device verifying the assembly means are positioned at the recorded first position, the assisting the work cycle sequence further comprises:

projecting by the lighting device the graphic instruction at the second spatial coordinates at the recorded second position;

positioning by the operator the assembly means at the projected graphic instruction at the second spatial coordinates at the recorded second position;

detecting by the sensor the spatial coordinates of the assembly means positioned in the work area;

verifying by the electronic control system through comparison of the second spatial coordinates at the recorded second position and the detected spatial coordinates of the assembly means positioned in the assembly area that the assembly means is positioned at the recorded second position; and actuating by the operator the input device verifying the assembly means is positioned at the recorded second position.

13. The method of claim 11, wherein the graphic instruction comprises a symbol.

14. The method of claim 11, wherein the lighting device is operable to project a first graphic instruction at the recorded first position and a separate independent second graphic instruction, wherein following detecting by the sensor of the spatial coordinates of the assembly means positioned in the work area; the method further comprises:

projecting by the lighting device the second graphic instruction at the detected spatial coordinates of the assembly means positioned in the work area.

* * * * *